United States Patent [19]

Abelitis

[11] 4,310,298
[45] Jan. 12, 1982

[54] METHOD AND DEVICE FOR PRODUCING COAL DUST

[75] Inventor: Andris Abelitis, Rösrath, Fed. Rep. of Germany

[73] Assignee: Klockner-Humboldt-Deutz AG, Fed. Rep. of Germany

[21] Appl. No.: 88,089

[22] Filed: Oct. 24, 1979

[30] Foreign Application Priority Data

Nov. 24, 1978 [DE] Fed. Rep. of Germany ....... 2850895

[51] Int. Cl.³ ............................................. F27B 15/00
[52] U.S. Cl. .................................... 432/14; 110/347; 432/106
[58] Field of Search ..................... 241/17; 432/14, 106; 110/347

[56] References Cited

U.S. PATENT DOCUMENTS

| | | | |
|---|---|---|---|
| 2,653,810 | 9/1953 | Heilmann | 110/261 |
| 4,083,676 | 4/1978 | Ritzmann et al. | 432/106 |
| 4,206,712 | 1/1980 | Vatsky | 110/261 |
| 4,226,585 | 10/1980 | Deussner | 432/106 |
| 4,226,586 | 10/1980 | Brachthauser | 432/106 |
| 4,236,886 | 12/1980 | Ansen et al. | 432/14 |

Primary Examiner—John J. Camby
Attorney, Agent, or Firm—Hill, Van Santen, Steadman, Chiara & Simpson

[57] ABSTRACT

A method and apparatus for the production of coal dust includes a connection between a pulverizing mill's exhaust gas output port and a transition region between a preheater region and a calcination region of a related calcination installation which uses the coal dust as a fuel.

9 Claims, 2 Drawing Figures

METHOD AND DEVICE FOR PRODUCING COAL DUST

BACKGROUND OF THE INVENTION

1. Field of the Invention

This invention relates to a method as well as to a device for producing coal dust in a coal grinding and drying system, particularly for firing of a combustion system usable in the manufacture of cement clinker.

2. Prior Art

In conjunction with this invention, the term "calcining" is meant to signify the thermal expulsion of $CO_2$ from a mineral.

Experience has taught that the following criteria, among others, should be taken into consideration in selecting a location for a coal pulverizing system to supply coal dust to a calcining installation.

1. The transport distances for the raw material or, respectively, finished products,
2. The connection of the coal grinding system to the gas circulation system of the consumer system, particularly for the removal of hot gas with a low as possible content of oxygen for the grinding/drying operation, and
3. The elimination of any coal mill exhaust gas containing combustible materials or gases as well as odoriphores damaging to the environment.

In a combustion system for the manufacture of cement, comprising a pre-heating stage, calcining stage and kiln for clinker burning which is fired with coal dust, the coal grinding system should be erected, if possible, where hot gases with the lowest possible content of oxygen are available. This is because, after the grinding/drying operation in the grinding system, the exhaust gases including water vapor and secondary air added by the grinding system should have an oxygen content of less than 10%.

The exhaust gases withdrawn from suspension type heat exchanger systems with an operating temperature range of 350° C. to a maximum 500° C. exhibit an oxygen content of 2% to a maximum of 5%. Using these gases, as an input to the coal pulverizing system, the exhaust gases produced from the grinding/drying system exhibit usually no more than 10% oxygen.

The introduction of the mill exhaust gases with a temperature range of 80 through 100° C. into the associated combustion system is difficult. This is because the system supplied with the coal dust exhibits process sequences with endothermic reaction enthalpies such as, for example, sintering zones given minerals and ores, melting zones given ores, deacidification, calcining and mineral conversion areas given minerals, cement, limestone, dolomite, magnesite, earths, ores, etc.

As a result, as previously disclosed in the patent application No. P 27 45 424.6, corresponding to U.S. Ser. No. 949,953, now U.S. Pat. No. 4,193,554, it is desirable to integrate a method and a device for the drying and fine-grinding of coal for the powdered coal firings of a combustion system with this combustion system. In this way, operating conditions which are optimum for the integrated system may be determined based on economic feasibility, reliability and operational safety. In particular, any deterioration of the calcining process must be avoided.

SUMMARY OF THE INVENTION

The inventive apparatus and method comprises an integrated system, using inert gases from an installation, such as a calcining installation, to provide an essentially explosion proof environment to grind coal into dust to fuel the related installation. The coal dust bearing exhaust gases produced while grinding the coal are then returned to the related installation as a secondary source of fuel.

It has now been surprisingly found that the integrated system performs optimally when the coal mill exhaust gas is introduced in the transition area of the calcining stage and preheating state of the related installation. This means that the mill exhaust is essentially introduced in a temperature range between approximately 800° C. and approximately 850° C.

The following advantages result from the invention:

1. The combustible coal particles contained in the mill exhaust gas are completely gasified in this temperature range and can completely burn out before emission from the plant system.
2. By so doing, the disturbing odoriphores of the mill exhaust which are not acceptable in terms of environmental contamination can be eliminated by means of pyrolysis at high temperature.
3. Since the introduction of the mill exhaust gases, as seen from the direction of the kiln exhaust gas stream, is undertaken at the end of the calcining segment, a deterioration of the deacidification process in the course of the calcining operation, for example, due to temperature reduction, need not be feared.
4. A deterioration of the secondary firing due to ballast gases with a disruption of the combustion processes of the secondary firing is avoided.

It is provided in a development of the method that the mill exhaust be introduced in a heat exchanger cyclone of the calcining stage. This is achieved in that the mill exhaust, given a calcining stage equipped with secondary firing, is introduced into a heat exchanger cyclone, connected downstream, with respect to the direction of movement of the kiln exhaust gas stream, to this secondary firing.

The gas injection can be implemented advantageously if the mill exhaust gas is introduced tangentially into the cylindrical part of the cyclone.

Given a four-stage cyclone heat exchanger system, a preferred form of practicing the invention includes introducing this mill exhaust gas into the third cyclone, with respect to the direction of movement of the material stream through the preheating and calcining regions.

An apparatus for implementing the method includes means for introducing the coal dust bearing exhaust gas into a transition zone between a preheating section and a calcining section of the related installation. The means for introducing can also include an exhaust line which discharges the mill exhaust gases into the transition area of calcining stage and pre-heater stage.

DETAILED DESCRIPTION OF THE PREFERRED EMBODIMENTS

Figure 1:
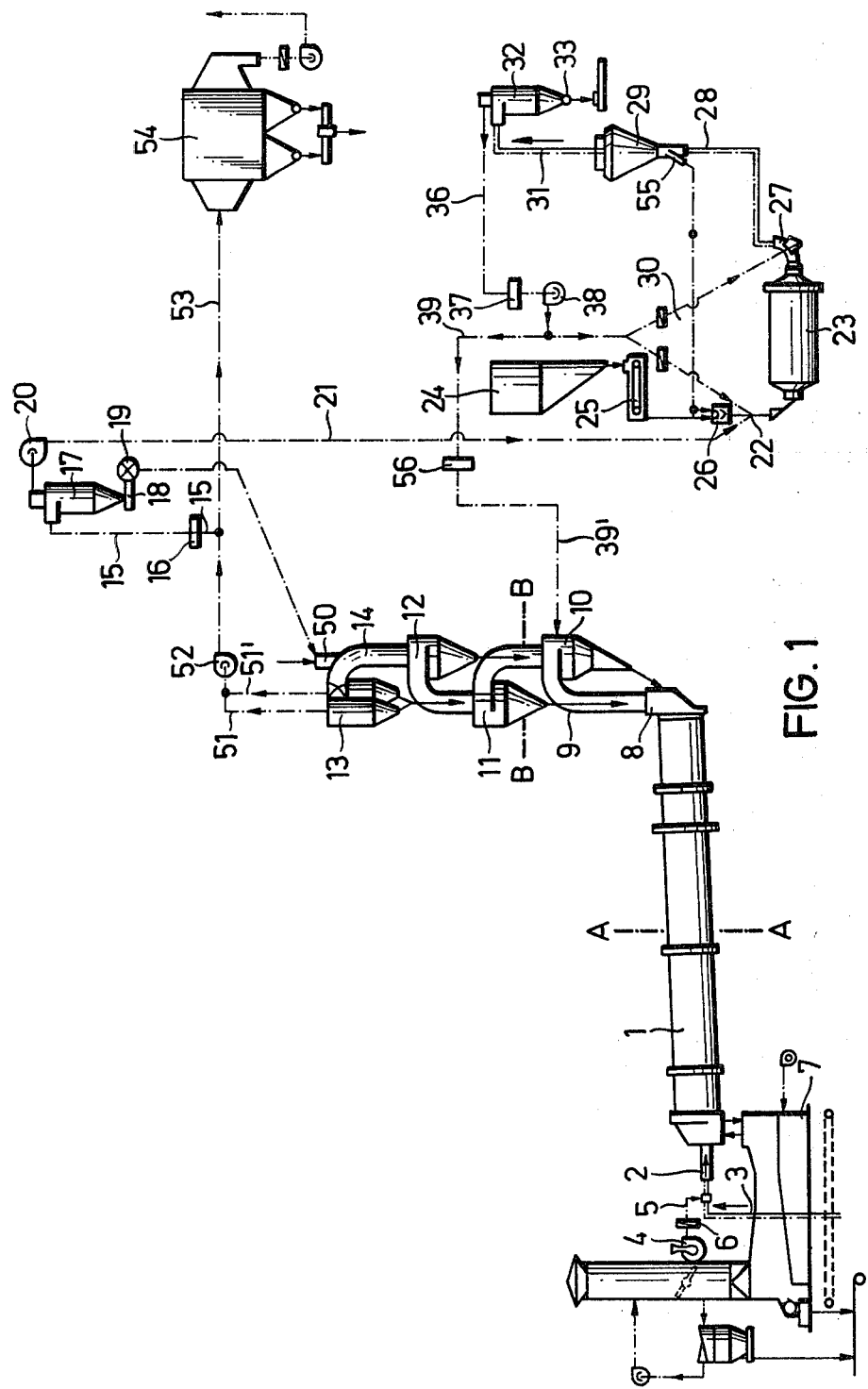
FIG. 1 is a schematic block diagram of an apparatus implementing the inventive method in a burning system for manufacturing cement clinker including an airless grinding mill that provides powdered coal to fuel the burning system.
Figure 2:
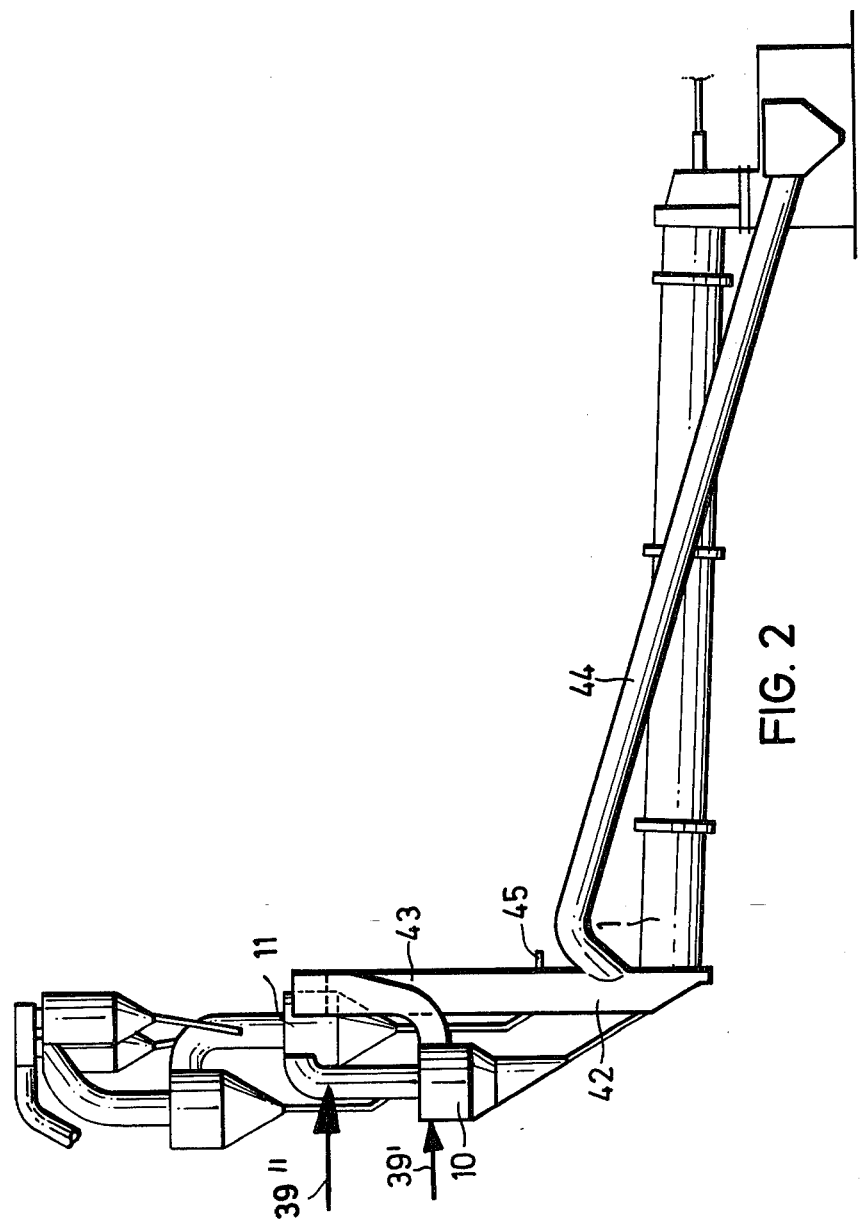
FIG. 2 is a partial schematic view of a burning system with a calcinating stage equipped with burners for secondary firing.

Not by way of limitation but by way of disclosing the best mode of practicing my invention and by way of enabling one of skill in the art to practice my invention, there is disclosed in FIGS. 1 and 2 an illustrative embodiment of my invention.

The system of FIG. 1 has a rotary kiln 1 with a burner 2 supplied with coal dust from a line 3 as well as with primary air from a blower 4 through a line 5 having a control element 6. A clinker cooler 7 is post-connected to the kiln 1 on the product output side. The cooling air of the clinker cooler 7 is entirely or predominantly introduced as hot secondary air into the rotary tubular kiln 1. At the other end of the rotary tubular kiln 1 there is situated a kiln intake 8 to which a kiln exhaust gas line 9 is connected. The line 9 discharges tangentially into a cyclone 10. A heat exchanger system includes the cyclone stage 10 and three more cyclones 11, 12 and 13 which are connected together. The heat exchanger cylone stages 10–13 together with the rotary tubular kiln represent the burning system.

In the present exemplary system, the cyclones 11–13 form the pre-heating stage. The area between the section line B—B and A—A comprises the calcining stage. The calcining stage includes the heat exchanger cyclone 10 as well as the part of the rotary tubular kiln 1 between the kiln intake 8 and approximately the center of the kiln. Connected thereto, as viewed in the direction opposite the direction of flow of the gas, is the sintering stage which extends approximately from the section line A—A to the radiation section of the flame of the burner 2.

Two exhaust gas lines 51, 51' are connected to the twin heat exchanger 13 and to a suction input port of a waste gas exhauster or blower 52. The exhaust gas line 53 is connected between an output of the blower 52 and an input of a dust removing device, an electro-filter 54.

A branch conduit 15 is connected to the exhaust gas line 53. The branch conduit 15 is connected via a control element 16 to a separator 17 which separates solids. An output for the solids from the separator 17 leads back to a raw material feed 50 of the pre-heating stage through a discharge element 18 and a bucket wheel sluice 19. A gas removal line leads from the separator 17 to an input port of a blower 20. An output port of the blower 20 is connected to a conduit 21. The conduit 21 is also connected to a junction input member 22 of a tube mill 23. The conduit 21 supplies inert gas from the calcination installation having the kiln 1 and cyclones 10–13.

The gas supplied by the conduit 21 has a temperature of approximately 350°, contains approximately 3%–4% oxygen and has a $CO_2$ content in a range of 28%–33%.

The airless grinding mill comprises a raw coal hopper 24, a discharge element 25 which distributes raw coal in doses to the junction member 22 of the tube mill 23 via a double pendulum sluice 26. The supply line 21 for the inert gas also discharges into the junction 22. An output line 28 is connected to a mill outlet port 29. The line 28 discharges into an air-suspension sifter 29. The sifter 29 has a grit outlet 55 which recirculates grit via a conveyor device 30 into the junction member 22 of the tube mill 23 through the double pendulum sluice 26.

The exhaust gases from the mill 23 are suctioned, through a finished product line 31, into a separator 32. The mill exhaust gas is drawn from a gas output port of the separator 32, via a control element 37, to an exhaust blower 38. A conduit 39 is connected between an output port of the blower 38, through a control element 56, a line 39' and into the upper region of the separator 10. The mill exhaust gas is forced by the blower 38, through the lines 39, 39' into the cyclone 10.

By means of the apparatus of FIG. 1, the mill exhaust gases are diverted in a manner which is secure and not harmful to the burning system because it does not deteriorate the calcining operation. In this manner, a separate filtration of this part of the exhaust gas is avoided. At the same time, the odoriphores and combustible substances present in the exhaust gas component are burned and are completely eliminated economically and without problems.

FIG. 2 shows a similar burning system in which the calcining stage is equipped with a secondary firing. The perpendicular mixing segment 42 is attached to the rotary tubular kiln 1. The mixing segment 42 merges into a reaction segment 43 in which a tertiary air line 44 discharges. A burner 45 is arranged between the mixing segment 42 and the reaction segment 43. Finally, the calcining device 43 discharges into the cylindrical part of the heat exchanger cyclone 10. The mill echaust line 39, 39' discharges into the same region of the cyclone 10.

The mill exhaust gas can also be introduced into the third cyclone 11, as seen in the direction of the material stream, at a location 39". At the location 39''', the gas temperature has a range of 720 through 740° C.

The invention is not limited the methods and devices for producing coal dust in a burning system serving for the manufacture of cement clinker. On the contrary, the basic considerations of the advantageous introduction of mill exhaust gas in a transitional area between a calcining stage and a pre-heating stage are valid everywhere where such devices are employed for the implementation of endothermic reaction enthalpies, particularly for deacidification, calcining of minerals, ores, raw materials for cement, limestone, etc.

Although various modifications might be suggested by those skilled in the art, it should be understood that I wish to embody within the scope of the patent warranted hereon all such modifications as reasonably and properly come within the scope of my contribution to the art.

I claim as my invention:

1. An improved method for drying and pulverizing coal in a pulverizing apparatus to produce a supply of coal dust for firing a related installation having a pre-heating stage and a calcining stage with a transitional region therebetween, the related installation supplies heated, essentially inert gas to the pulverizing apparatus, the improvement steps comprising:
    supplying at least a part of the coal dust bearing exhaust gas to the related installation, and
    introducting the part of the coal dust bearing exhaust gas into a section of the transition region at a temperature in a range of 720° C. to 850° C.

2. The improved method according to claim 1, wherein the temperature range is between 800° C.–850° C.

3. The improved method according to claim 1, wherein the related installation includes a plurality of heat exhchange cyclones for pre-heating and calcining and wherein the improvement step of introducing comprises further,
 introducing the coal dust bearing exhaust gas into one of the calcining heat exchanger cyclones.

4. The improved method according to claim 3, wherein the calcining stage includes means for secondary firing and wherein the step of introducing comprises further,
 introducing the coal dust bearing exhaust gas into one of the heat exchanger cyclones connected downstream, with respect to the direction of flow of the kiln gases, from the means for secondary firing.

5. The improved method according to claim 4, wherein the step of introducing comprises further:
 introducing the coal dust bearing exhaust gas tangentially into the heat exchanger cyclone.

6. The improved method according to claim 3, wherein the preheater and the calcination stages include a four-stage cyclone-type heat exchanger system and wherein the step of introducing comprises further,
 introducing the coal dust bearing exhaust gas into the third cyclone, with respect to the direction of movement of the stream of material being preheated and calcined.

7. In an apparatus for the safe production of coal dust for use in a related installation with a preheated stage and a calcining stage, the related installation is capable of supplying a stream of substantially inert gas to the improved apparatus, the apparatus including:
 means for supplying coal to be pulverized connected to
 means for mixing a part of the inert gas with the coal to be pulverized connected to
 means for pulverizing coal mixed with the gas connected to
 means for separating pulverized coal into coal dust and an exhaust gas containing a residue of coal dust
an improvement comprising:
 means for supplying the exhaust gas containing the residue of coal dust to a transition region between the preheating stage and the calcining stage of the related installation.

8. In an apparatus for supplying pulverized coal dust to a calcination installation with a preheater stage and a calcination stage, the apparatus having,
 a first input conduit for supplying a stream of substantially inert gas at a first predetermined temperature connected at an input end to the calcination installation;
 a source of coal with an output port operable to supply a regulated stream of coal to be pulverized;
 a pulverizing mill with an input port and an output port;
 a junction member connected to said input port of said mill, an output end of said input conduit and said output port of said source of coal;
 means for separating with an input port connected to said output port of said mill, said means for separating is adapted to separate a stream of pulverized coal dust and coal gravel generated within said mill into a stream of coal gravel at a gravel output port, a stream of coal dust at a dust output port and a stream of exhaust gas bearing a residue of coal dust at an exhaust gas output port;
an improvement comprising:
 means for supplying the coal dust bearing exhaust gas to a transition region between the preheater stage and the calcination stage of the calcination installation.

9. The improved apparatus according to claim 8, wherein:
 said means for supplying includes an exhaust conduit which supplies the coal dust bearing exhaust gas to the transition zone.

* * * * *